Figure 9:
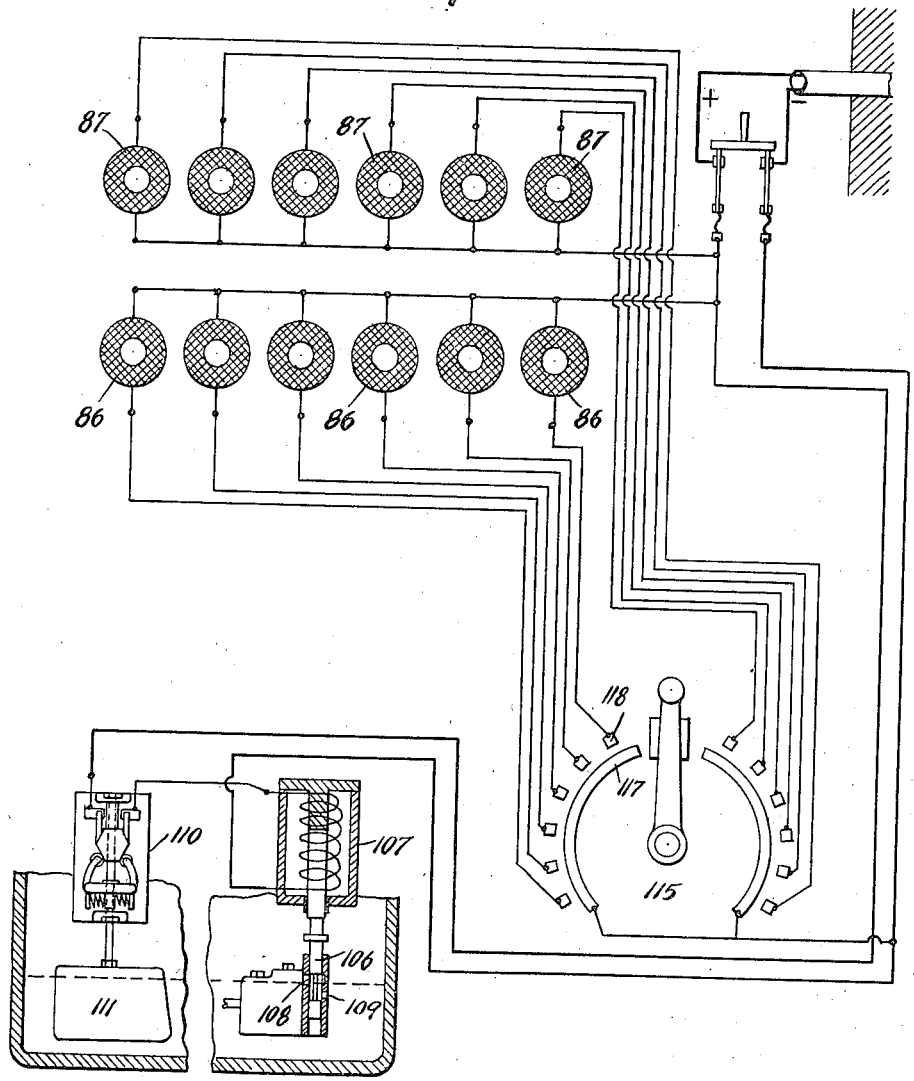

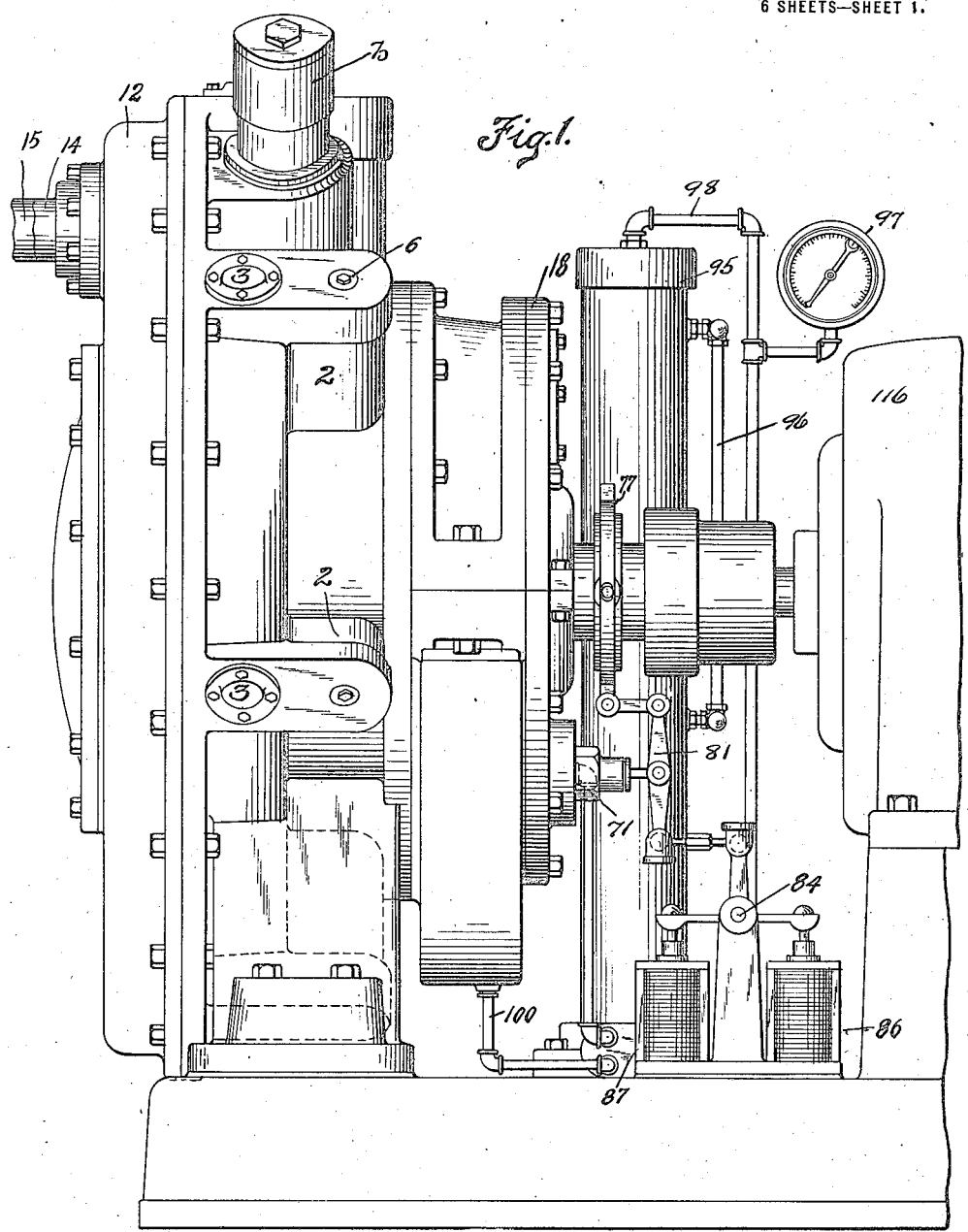

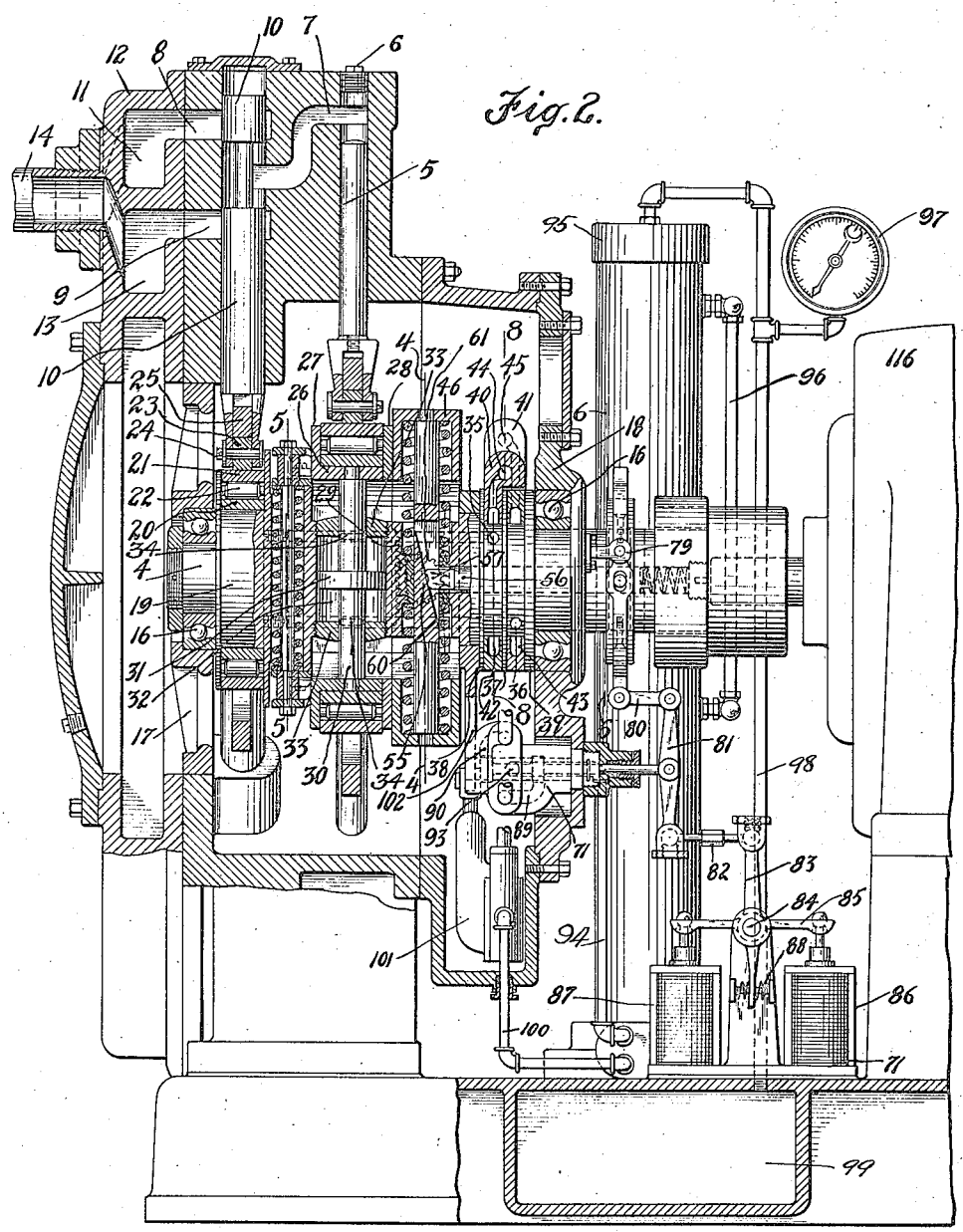

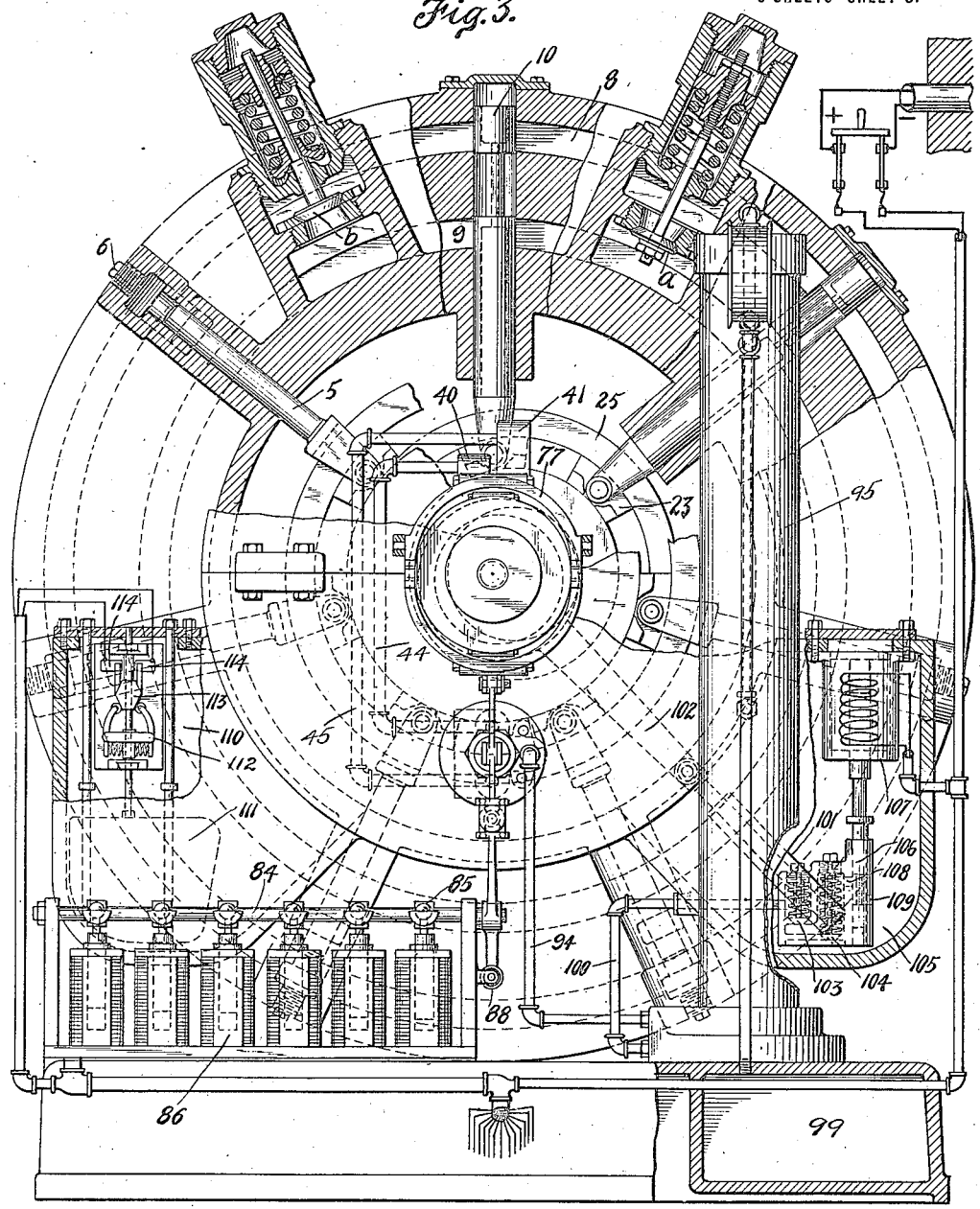

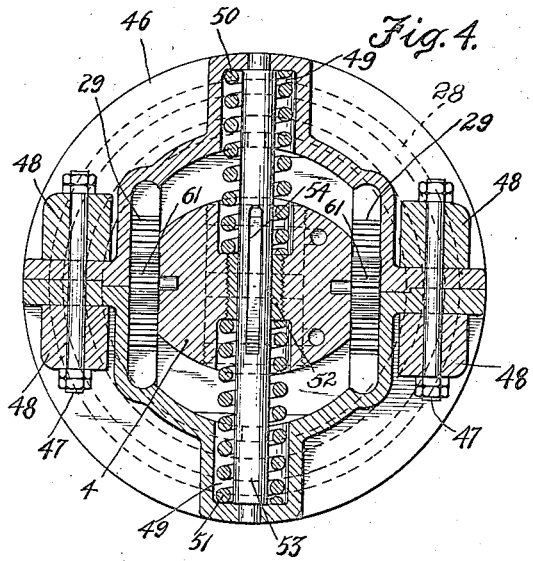
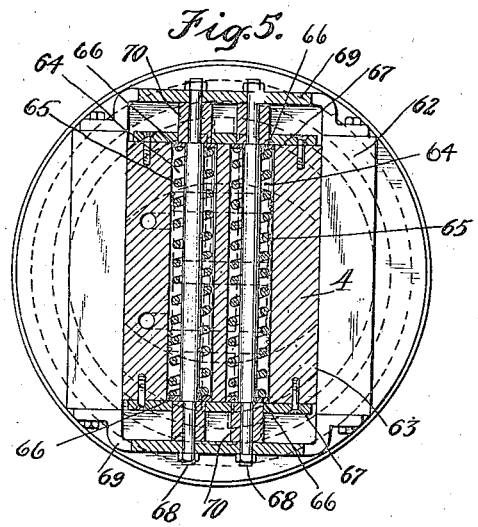
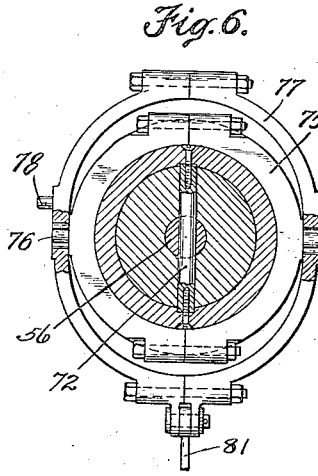
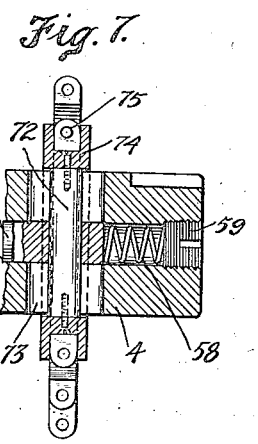
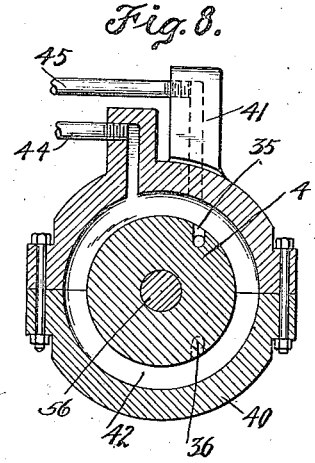

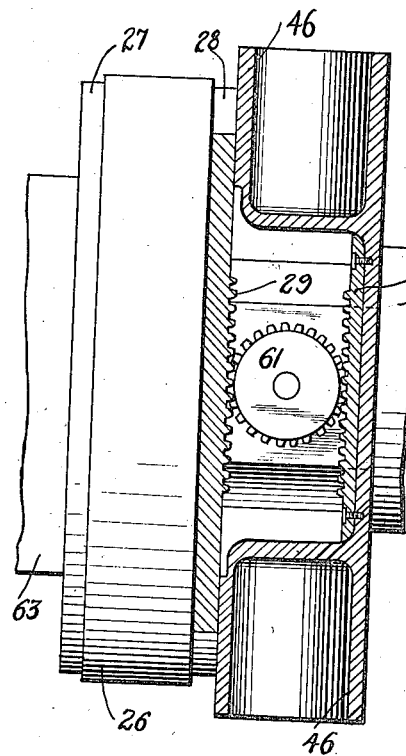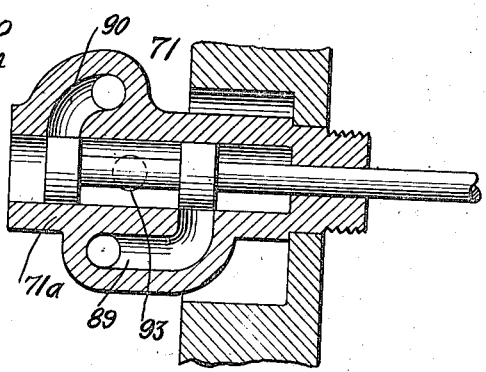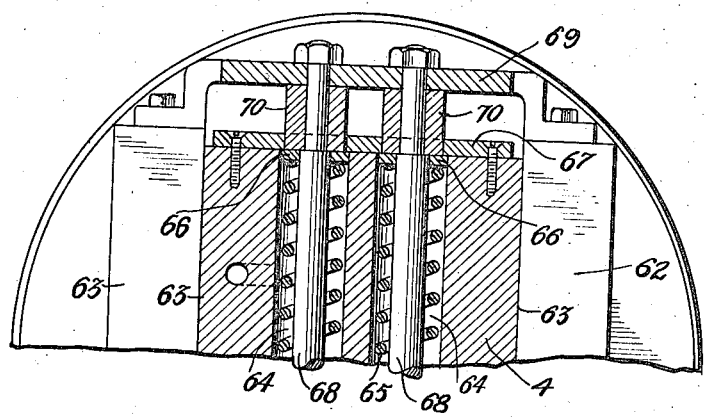

UNITED STATES PATENT OFFICE.

AUGUST SUNDH, OF HASTINGS-UPON-HUDSON, NEW YORK, ASSIGNOR TO OTIS ELEVATOR COMPANY, A CORPORATION OF NEW JERSEY.

FLUID MOTOR OR PUMP.

1,274,955.	Specification of Letters Patent.	Patented Aug. 6, 1918.

Application filed March 20, 1915, Serial No. 15,715. Renewed February 14, 1918. Serial No. 217,226.

*To all whom it may concern:*

Be it known that I, AUGUST SUNDH, a citizen of the United States, residing in Hastings-upon-Hudson, in the county of Westchester and State of New York, have invented a new and useful Improvement in Fluid Motors or Pumps, of which the following is a specification.

My invention relates in general to fluid motors or pumps, and is directed more particularly to a device of this character in which the stroke of the pistons may be varied.

One object of the invention is the provision of fluid pressure means for effecting any desired stroke of the motor or pump.

Another object of the invention is the provision of a system of electrical control for the stroke varying means.

Another object of the invention is the provision of means for balancing the rotating parts of the apparatus and compensating for centrifugal action thereon.

A further object of the invention is the provision of automatic means for storing a fluid under pressure for use in operating the stroke varying mechanism.

Other objects of the invention will appear hereinafter, the novel combinations of elements being pointed out in the annexed claims.

In the accompanying drawings, I illustrate a preferred embodiment of my invention, in which, Figure 1 is an elevation view of the assembled apparatus; Fig. 2 is a sectional view of Fig. 1; Fig. 3 is a part side section of Fig. 2; Fig. 4 is a detail side section of Fig. 2, the section being taken on the line 4—4; Fig. 5 is a detail side section of Fig. 2, the section being taken on the line 5—5; Fig. 6 is a section view of Fig. 2, the section being taken on the line 6—6; Fig. 7 is a sectional detail view of Fig. 2, showing a valve controlling device; Fig. 8 is a detail side section view of Fig. 2, the section being taken on the line 8—8; Fig. 9 is a wiring diagram showing the various electric circuits of the apparatus; Fig. 10 is an enlarged view showing the racks of Fig. 2 in place; Fig. 11 is an enlarged view of part of the valve mechanism of Fig. 2; and Fig. 12 is an enlarged view of part of the mechanism of Fig. 5.

Like reference characters are used to denote similar parts in all of the figures.

As shown on the drawings, the pump or motor comprises a plurality of cylinders, such as 2—2, and corresponding valves as 3—3, which are preferably constructed "en bloc" and are radially and symmetrically disposed about the shaft 4. While the number of the cylinders is entirely optional, I prefer an odd number of cylinders, such for example as seven, since with this arrangement the torque to which the shaft is subjected is very uniform and the capacity or power of the device is great in comparison to the over-all dimensions of the complete pump or motor.

Since the cylinders and valves are all alike, respectively, a description of one of them will answer for all. Each cylinder contains a reciprocating piston or plunger 5, and is closed at one end by a screw plug 6. A port 7 leads from the cylinder to the valve chamber and this port is alternately placed into communication with the valve ports 8 and 9 by the piston valve 10—10. The valve port 8 leads into an annular chamber 11 cored in the head 12, while the valve port 9 leads into a similar chamber 13. Each chamber 11 and 13 is provided with a pipe connection 14 and 15, respectively, which connections lead to any suitable suction and discharge. The chambers 11 and 13 may be placed in communication with each other through one of the spring loaded check valves *a* or *b* in case the difference in pressure in the chambers becomes excessive or dangerous. The shaft 4 which drives the various pistons and valves, is supported at its left hand end by antifriction bearings 16 carried in the frame 17, while near the other end are similar bearings 16 carried by the casing cover 18. The valves are reciprocated by means of a flanged eccentric 19 formed integral with the shaft 4 and encircled by the hardened steel rings 20 and 21 having antifriction rollers 22 located between them. One end of the valve piston 10 is formed with a yoke to which is pivoted a block 23 by means of a pin 24 and this block bears against the outer periphery of the ring 21 and is maintained in that position by means of a ring 25 which passes through the yoke on the valve piston. It is obvious that with this arrangement a rotation of the shaft 4 will effect a reciprocation of all the valve pistons.

The pump or motor pistons 5 are reciprocated from the shaft 4 by means of an eccentric 26, and the construction and arrangement of the parts intermediate this eccentric and the yoked end of each piston 5 is similar to that just described in connection with the valve eccentric 19 and the valves 10. The eccentric 26 is provided with a flange 27 on the left hand side as viewed in Fig. 2 and a plate 28 secured to the opposite side, the said plate being provided with a pair of toothed racks 29, 29, spaced apart as shown in Fig. 4.

In order that the stroke of the pistons 5 may be varied, I provide fluid actuated means whereby the eccentricity of the eccentric 26 may be varied by effecting a shifting of the latter upon the diametrically opposite flattened sides of the shaft as shown in Fig. 4. To effect this result, I provide a rod 30 with tenons or reduced parts on its ends which fit into corresponding holes in diametrically opposite sides of the eccentric. Intermediate the ends of the rod 30 is a piston 31 adapted to move in a cylinder 32 bored through the shaft and at right angles thereto, the cylinder being closed at both ends by cylinder heads 33, 33. Ports 34, 34, lead from each end of the cylinder 32, through the shaft, parallel to its axis and have their exit upon the surface of the shaft at the ports 35 and 36 which are separated from each other by a flange 37 on the shaft. Other flanges 38 and 39 are located on either side of the flange 37 and form therewith, two parallel grooves, in each of which is a snugly fitted fluid tight split ring 40 and 41, each having an annular port 42 and 43, communicating with the pipes 44 and 45, respectively. By means of these pipes and a suitable valve, fluid under pressure may be admitted to either end of the eccentric shifting cylinder 32 at will, the valve mechanism for effecting this end being pointed out later on.

The fixed eccentric 19 by which the valves are reciprocated may be of light construction, since the valves are all balanced against fluid pressure and hence power transmitted from this eccentric to the valves is of small moment. If one desires to counterbalance this eccentric, it may easily be done in the usual way by a counterbalance weight. The eccentric 26, however, transmits the full power of the pump or motor, and therefore the same should be of substantial construction and have considerable weight. When this eccentric is in a position of zero stroke of the pistons, it will, of course, be concentric with the shaft and in mechanical balance when rotated by the shaft. If, however, the eccentric be shifted at right angles to the shaft, so as to become eccentric to the latter, it immediately becomes out of balance, and, if rotated at an appreciable speed, the centrifugal force acting on it will be such that it will require a large amount of power to move it to a position to shorten the stroke of the working pistons. The power necessary so to move it is dependent upon the amount of eccentricity, and the weight of the eccentric and parts associated therewith, and also upon the speed at which the eccentric is rotated. In order, therefore, that the eccentric 26 may be counterbalanced for every position to which it may be moved or shifted, and in order that the effort or power required to shift it from one position to another may be practically negligible, I provide the following mechanism: On the right hand side of the eccentric 26 as viewed in Fig. 2 is located a counterbalancing member 46, which is substantially circular in contour and split through the middle so as to form two similar halves (see Fig. 4), which are bolted together when placed in position on the shaft 4 by the bolts 47, which latter also serve to secure in place a number of weights 48 whose mass is properly proportioned to suit conditions. The interior of the member 46 is provided with recesses 49, located diametrically opposite each other, and inclosing one end each of a pair of heavy springs 50, 51, respectively. The other ends of these springs lie in recesses cut in the shaft and bear against a common plug 52 screwed into the shaft. A rod 53 passes loosely through the plug 52 and is tenoned into the counterbalancing member 46 at each end. The center of the rod 53 contains a tapering groove 54 which forms a tapered wedge 55 (see Fig. 2) in engagement with which is a rod 56 passing through the center of the shaft 4 and having a nose 57 tapered off to correspond to the taper of the wedge 55, with which it is held in contact by means of a spring 58 bearing against a screw plug 59 in the end of the shaft 4. (See Fig. 7). The counterbalancing member 46 is provided with a pair of racks 60 in alinement with the racks 29 carried by the plate 28 in the eccentric, and corresponding racks of each pair of racks engage and mesh with one of a pair of spur gears 61 mounted on pinions carried by the shaft 4. With this construction it is obvious that if the eccentric 26 be moved in one direction, the counterbalancing member 46 will be constrained to move in the opposite direction by reason of the rack and gear connection between the two.

Upon the left hand side of the eccentric 26, as viewed in Figs. 2 and 5, is a frame 62, which is secured to the eccentric flange 27, and slides upon a squared portion 63 of the shaft 4. This squared portion 63 is pierced by a pair of parallel holes 64, each of which contains a stiff compression spring 65, bearing against washers 66, at each end, each washer bottoming upon one of a pair of plates 67 secured to the shaft. In the center of each spring 65 is a rod 68 which is bolted at either end to brackets 69 carried by the frame 62, two bushings 70 being mounted on each rod between a washer 66 and an adjacent bracket 69. With this construction it is obvious that the springs 65 are double acting and tend to resist any sliding movement of the frame 62 relative to the shaft.

In order to shift the eccentric 26 by means of fluid pressure acting against the piston 31, I provide a hunting or pilot valve 71 which is operatively connected to the rod 56, in the center of the shaft 4. This connection comprises a pin 72, (see Figs. 2, 6 and 7), affixed to the rod 56, and adapted to slide longitudinally of the shaft 4 in a slot 73 in the shaft. Each end of the pin 72 is secured to a ring 74 having a circumferential groove in which is loosely carried a split ring 75, having trunnions 76 at either side. These trunnions are carried by a split yoke 77 having trunnion pins 78 supported by brackets 79 secured to the pump casing. The lower end of the yoke 77 is connected by a link 80 to a lever 81, which in turn is connected by a turnbuckle 82 to a lever 83 mounted on a shaft 84. The latter is provided with a series of double arm levers 85 equally spaced thereon, the corresponding end of each lever being connected to the core of a series of electromagnets 86, while the opposite ends of the levers 85 are in like manner connected to the cores of a similar series of electromagnets 87. Each series of electromagnets is arranged in a well known way so as to act progressively when suitably energized, so as to effect a step by step rotary movement of the shaft 84 in either direction. Any suitable centering device for the shaft 84 may be used and such device is here shown as comprising centering springs 88. The stem of the pilot valve 71 is connected to the lever 81, at a point intermediate its ends, and the valve, when in an intermediate position as shown in Fig. 2, closes the two valve ports 89 and 90 which are connected by the pipes 45 and 44 to the shaft ports 36 and 35, respectively. If the valve be moved in one direction or the other, a pressure port 93 is placed into communication with either of the ports 89 and 90 according to the direction in which it is moved. The pilot valve cylinder is open at each end to the interior of the main pump casing, so that when the pressure port 93 is placed into communication with one of the ports 89, 90, as the case may be, the other port is free to discharge fluid from the cylinder 32 into the pump casing. The pressure port 93 is connected by a pipe 94 to a pressure tank or accumulator, comprising a vertical container 95 provided with a sight glass 96 and pressure gage 97 also a pipe 98 leading from the top of the accumulator to an air tight compartment 99 cast integral with the base of the pump or motor. The accumulator is charged through the pipe 100 by means of a small pump 101 which is reciprocated through an eccentric on the pump shaft 4 by means of a connecting rod 102. The valves of pump 101 are shown at 103 and 104, and are ordinary spring loaded check valves, the one shown at 103 being the discharge valve, while the one shown at 104 is the suction valve, the latter admitting fluid into the pump from the pocket 105 formed in the main pump casing, the pump forcing this fluid under pressure through the check valve 103 into the accumulator. An additional valve 106 is controlled by an electromagnet 107 and the same is adapted when in raised position with the magnet energized as shown (see Fig. 3) to permit the pump 101 to idle or by-pass and hence no fluid will be forced into the accumulator. When the valve 106 is raised, the pump receives fluid from the pocket 105 and delivers it through the port 108, and out of the port 109 into the pocket 105. When the valve 106 is closed the fluid from the pump cannot pass through the port 108 and hence must raise the check valve 103 and be forced into the accumulator under pressure, and this pressure is available to effect the shifting of the eccentric regardless of whether the pump is in operation or not.

The energization of the magnet 107 and the consequent control of the by-pass valve 106 is effected by means of a switch 110, which is actuated by a float 111, shown in Figs. 3 and 9. The switch 110 is of the "snap" type, and comprises a movable crosspiece 112, carrying two spring pressed arms, having rollers at one end. The latter coact with a diamond or double wedge shaped insulated member 113, which is free on the float stem and carries a pair of contact fingers adapted electrically to engage corresponding fixed contacts 114. When the float is raised, the rollers ride up on the lower inclined faces of the wedge 113, and reaching the middle thereof, the springs operate quickly to move the wedge downwardly and thereby open a circuit between the contacts 114. The switch closes itself in a similar manner as the float is lowered beyond a predetermined point. As shown in the wiring diagram in Fig. 9, the switch 110 and the by-pass magnet 107 are connected in series across the mains of any suitable electrical source of supply designated by the usual characters + and −. It will be understood from the foregoing description that when a fluid collects in the base of the main pump, the float 111 is raised and the circuit to the bypass magnet is opened, thereby permitting the valve 106 to close the bypass port 108, and the small pump 101 forces the fluid into the accumulator. As the level of fluid in the base of the main pump lowers, the magnet 107 is automatically energized and the pump merely idles or bypasses. The control of the main pump is effected by a master switch 115, which is adapted successively to energize the magnets 86 or 87, from right to left as shown in Figs. 3 and 9.

The pump or motor is shown as being in a position of zero stroke, and in order to effect its operation the lever of the master switch 115 is moved to one side or the other to shift the main eccentric 26.

Assuming the device is to function as a pump and the shaft 4 is rotated at constant speed by an electric or other motor, 116, the operation is as follows: The lever of the master switch is first moved in a left hand direction until it establishes an electrical connection between the contact segment 117 and the first contact 118. The right hand magnet 86 is at once energized to pull down its core and give the shaft 84 a limited rotative movement, which movement is communicated through the levers 83 and 81 to the pilot valve 71. The stem of this valve is consequently moved in a right hand direction, the upper pivot of lever 81 acting as a fulcrum, and the valve port 89 is placed in communication with the pressure port 93 connected to the accumulator. Fluid under pressure passes through the pipe 45 and is conducted by the ports 43 and 36 to the lower part of the cylinder 32. The piston 31 is in consequence moved upwardly carrying with it the rod 30 and eccentric 26, which heretofore was in a position of zero stroke concentric with the shaft. The eccentric 26 now functions as such, and the pump pistons are put to work, the valves 10 alternately connecting each pump cylinder with the suction and discharge chambers 11 and 13. As the eccentric 26 moves upwardly, it carries with it the double rack 29, 29, which effects a corresponding downward movement of the double rack 60, 60, through the spur gears 61, 61, and the counterbalancing member 46 to which the racks 60, 60 are affixed, also moves downwardly. When this action takes place, the wedge 55 formed in the rod 53, tends to move away from the tapered nose 57 on the rod 56, which permits the spring 58 bodily to move the rod 56 in a left hand direction. This movement is communicated to the yoke 77, and the latter swings upon its pivot, and moves the stem of the pilot valve 71 in a left hand direction, until the valve once more occupies its closed position, cutting off any further supply of fluid to the eccentric shifting cylinder 32 and the eccentric assumes a position of rest, corresponding to the extent of movement of the master controller 115.

A further movement of the master switch in the same direction as before, will energize the second magnet 86, again to open the pilot valve 71, resulting in a further shifting of the eccentric to increase the pump stroke. The movement of the eccentric is attended by a corresponding movement of the counterbalancing member 46 in the opposite direction, which, as before, enables the rod 56 to close the pilot valve and the eccentric becomes in effect fixed in position. As the master switch lever is further moved successively over the contacts, the magnets 86 are energized in progressive order or sequence to operate the pilot valve to shift the eccentric until the last contact is reached, when the eccentric will be moved to its limit of movement or position of full stroke of the pump pistons, and the pump will operate at full capacity.

If the master switch lever be moved in a right hand direction from its center position, it is obvious that the series of magnets 87 will be successively energized to move the pilot valve in a reverse direction, so as to admit fluid under pressure from the accumulator to the upper part of the eccentric shifting cylinder 32, which will result in a bodily shifting of the eccentric in a downward direction, attended by a corresponding upward shifting of the counterbalancing member 46. This movement of the latter causes the wedge 55 to force the rod 56 in a right hand direction against the action of the spring 58 to effect the closing of the pilot valve, and the eccentric is shifted, and fluid locked, in a position corresponding to the position of the master switch lever. Thus it is seen that the eccentric may be shifted by means of the master switch from a position of zero stroke to a maximum stroke, in either direction, and also to any desired intermediate position, in every instance the eccentric being locked in adjusted position by the fluid entrapped in the shifting cylinder 32. By reversing the stroke of the pump pistons, the pump will deliver fluid in a reverse direction, whereas if the pump be used as a fluid pressure motor, a reversal of the stroke of the pistons will cause the shaft 4 to be driven in a reverse direction.

A most important part of the invention consists in the means for counterbalancing the eccentric throughout its entire range of movement, and for compensating for the action of centrifugal force, so that not only will the pump operate without vibration even when running at high speeds, but also the power required to effect the shifting of the eccentric when the pump is in operation will be minimized and for all practical purposes may be neglected. As before pointed out, the means by which I attain the desired result, comprises the spring pressed sliding frame 62, and counterbalance member 46, and the manner in which they act, is as follows: When the eccentric is shifted in one direction, the counterbalancing member 46 is moved a proportionate amount in the reverse direction, against the action of one of the springs 50 or 51, as the case may be. As the member 46 moves out of concentric position with respect to the pump shaft, it immediately tends further to move out under the action of centrifugal force, but this tendency is compensated for by the opposing action of one of the springs 50, 51, hence practically all strain is removed from the spur gears 61, 61, and their corresponding racks which would be present to a great degree were it not for the action of the springs. The action of centrifugal force on the eccentric is compensated for by the spring pressed sliding frame 62 which slides with the eccentric, and is opposed by the combined action of the springs 65. Hence it is seen that by properly porportioning the weight of the counterbalancing member 46 and the sliding frame as well as the strength of the springs associated with these parts, the pump will be mechanically balanced and the action of centrifugal force compensated for, so that but little power is required to shift the mechanism from one position to another when rotating. By reason of this provision, the duty of the eccentric shifting piston 31 becomes very light and hence this piston and its cylinder may be small and occupy but little space in the shaft. Furthermore, the pressure required to be stored in the accumulator may be moderate, which of course minimizes leakage and lessens the duty of the pump 101. The ease with which the eccentric may be shifted is of particular advantage, where the shifting is effected by means other than fluid pressure, such for example as by hand or by electromagnets.

Without limiting myself to the precise construction and arrangement of parts herein disclosed, what I claim as new and desire to protect by Letters Patent, is:—

1. A pump comprising a shaft and a piston reciprocated therefrom, fluid pressure means for varying the length of stroke of the piston, an accumulator for supplying fluid under pressure to said stroke varying means, a pump for charging said accumulator, a valve for bypassing the pump, and automatic electrically controlled means for controlling said bypass valve.

2. A pump comprising a piston, a shaft, an eccentric driven from the shaft for reciprocating the piston, fluid pressure means for shifting the eccentric to vary the stroke of the piston and to reverse the pump, a counterbalance for the eccentric, and means operated by said fluid pressure shifting means for shifting said counterbalance.

3. A pump comprising a piston, a shaft, an eccentric driven from the shaft for reciprocating the piston, fluid pressure means for shifting the eccentric to vary the stroke of the piston and to reverse the pump, a counterbalance for the eccentric, and an operative connection between said eccentric and counterbalance whereby the eccentric and counterbalance will shift simultaneously in opposite directions.

4. A pump comprising a piston, a shaft, an eccentric driven from the shaft for reciprocating the piston, fluid pressure means for shifting the eccentric to vary the stroke of the piston and to reverse the pump, a counterbalance for the eccentric, and a rack and pinion connection between the eccentric and counterbalance for constraining said parts simultaneously to move in opposite directions.

5. A pump comprising a piston, a shaft, an eccentric driven from the shaft for reciprocating the piston, means for shifting the eccentric to vary the stroke of the piston and to reverse the pump, a shifting counterbalance for the eccentric, an operative connection between the eccentric and counterbalance for effecting a simultaneous shifting of said parts in an opposite direction, and means to counteract the centrifugal action on said counterbalance.

6. A pump comprising a piston, a shaft, an eccentric driven from the shaft for reciprocating the piston, means for shifting the eccentric to vary the stroke of the piston and to reverse the pump, a shifting counterbalance for the eccentric, an operative connection between the eccentric and counterbalance for effecting a simultaneous shifting of said parts in an opposite direction, and a spring compressed by the shifting of the counterbalance for counteracting the centrifugal action on the counterbalance.

7. A pump comprising a piston, a shaft, an eccentric driven from the shaft for reciprocating the piston, means for shifting the eccentric to vary the stroke of the piston and to reverse the pump, a shifting counterbalance for the eccentric, an operative connection between the eccentric and counterbalance for effecting a simultaneous shifting of said parts in an opposite direction, and compression springs associated with the counterbalance for counteracting the effect of centrifugal force thereon throughout the entire range of movement of the counterbalance.

8. A pump comprising a piston, a shaft, an eccentric driven by the shaft for reciprocating the piston, means for shifting the eccentric to vary the stroke of the piston and to reverse the pump, and means to counteract the effect of centrifugal force acting on said eccentric.

9. A pump comprising a piston, a shaft, an eccentric driven by the shaft for reciprocating the piston, means for shifting the eccentric to vary the stroke of the piston and reverse the pump, and means operating with varying power to counteract the effect of centrifugal force acting on said eccentric.

10. A pump comprising a piston, a shaft, an eccentric driven by the shaft for reciprocating the piston, means for shifting the eccentric to vary the stroke of the piston and to reverse the pump, and means comprising a compression spring for resisting the shifting of said eccentric.

11. A pump comprising a piston, a shaft, an eccentric driven by the shaft for reciprocating the piston, means for shifting the eccentric to vary the stroke of the piston and to reverse the pump, and a spring tending to shift said eccentric into a position concentric with said shaft.

12. A pump comprising a piston, a shaft, an eccentric on the shaft for reciprocating the piston, a rod secured at either end to the eccentric, a piston on the rod, and means for directing a fluid under pressure to either side of the said last named piston to effect a shifting of the eccentric.

13. A pump comprising a piston, a shaft, an eccentric on the shaft for reciprocating the piston, a rod secured at either end to the eccentric, a piston on the rod, a cylinder for said piston, said cylinder being formed in said shaft with its axis at right angles to the axis of the shaft, and means for directing a fluid under pressure to said cylinder in order to effect a shifting of the eccentric.

14. A pump comprising a piston, a shaft, an eccentric on the shaft for reciprocating the piston, a rod secured to the eccentric, an additional piston carried by the rod and movable in a cylinder bore formed in the shaft, ports within the shaft leading to either end of said cylinder, and a pilot valve for directing fluid through said ports to effect a shifting of the eccentric.

15. A pump comprising a piston, a shaft, an eccentric on the shaft for reciprocating the piston, a rod secured to the eccentric, an additional piston carried by the rod and movable in a cylinder bore formed in the shaft, ports within the shaft leading to either end of said cylinder, a pilot valve for directing fluid through said ports to effect a shifting of the eccentric, and means controlled by the movement of said additional piston for closing said pilot valve.

16. A pump comprising a piston, a shaft, an eccentric on the shaft for reciprocating the piston, a rod secured to the eccentric, an additional piston carried by the rod and movable in a cylinder bore formed in the shaft, ports within the shaft leading to either end of said cylinder, a pilot valve for directing fluid through said ports to effect a shifting of the eccentric, and means controlled by the movement of said additional piston for effecting a fluid lock of the said additional piston and eccentric.

17. A pump comprising a piston, a shaft, an eccentric on the shaft for reciprocating the piston, fluid pressure means for shifting the eccentric to vary the stroke of the pump piston, a pilot valve for controlling said shifting means, and electroresponsive means for operating said valve.

18. A pump comprising a piston, a shaft, an eccentric on the shaft for reciprocating the piston, fluid pressure means for shifting the eccentric to vary the stroke of the pump piston, a pilot valve for controlling said shifting means, and electroresponsive means for effecting a step-by-step progressive movement of said valve.

19. A pump comprising a piston, a shaft, an eccentric rotated by the shaft for reciprocating the piston, fluid pressure means for shifting the eccentric to vary the stroke of the pump piston, a pilot valve for directing fluid to and from said shifting means, electroresponsive mechanism for moving said valve in one direction, and means operated by said shifting means for moving said valve in a reverse direction.

20. A pump comprising a piston, a shaft, an eccentric rotated by the shaft for reciprocating the piston, fluid pressure means for shifting the eccentric to vary the stroke of the pump piston, a pilot valve controlling said shifting means, an electroresponsive device for effecting a predetermined opening movement of said valve, and means operated by said shifting means for restoring said valve to closed position.

In testimony whereof, I have signed my name to this specification in the presence of two subscribing witnesses.

AUGUST SUNDH.

Witnesses:
WALTER C. STRANG,
JAMES G. BETHELL.